United States Patent [19]

Miyatake et al.

[11] Patent Number: 4,935,758
[45] Date of Patent: Jun. 19, 1990

[54] PROJECTION DISPLAY APPARATUS

[75] Inventors: Yoshito Miyatake; Yoshihiro Masumoto, both of Neyagawa, Japan

[73] Assignee: Matsushita Electric Industrial Co., Ltd., Osaka, Japan

[21] Appl. No.: 314,072

[22] Filed: Feb. 23, 1989

[30] Foreign Application Priority Data

Feb. 25, 1988 [JP] Japan .................. 63-42666

[51] Int. Cl.⁵ ............................................. G02B 27/18
[52] U.S. Cl. ........................................ 353/31; 353/34; 350/397
[58] Field of Search ...................... 353/30, 31, 34, 122, 353/121; 350/331 R, 401, 397, 170, 171, 173, 174; 358/60, 61

[56] References Cited

U.S. PATENT DOCUMENTS 2,642,487  2/1947  Schroeder .
4,850,685  7/1989  Kamakura et al. ............... 353/34 X

FOREIGN PATENT DOCUMENTS 62-169594  7/1987  Japan .
0037316    2/1988  Japan ..................................... 353/31

OTHER PUBLICATIONS

Morozumi et al., LCD Full-Color Video Projector, SID 86 Digest, p. 375.

"LCD Full-Color Video Projector", Shinji Morozumi et al., SID 86 Digest, pp. 375-378.

Primary Examiner—Harry N. Haroian
Attorney, Agent, or Firm—Wenderoth, Lind & Ponack

[57] ABSTRACT

A projection display apparatus which is designed to separate a light from the light source into color lights of three primary colors by a color separator, irradiate the respective color lights to corresponding three light valves, combine the optical images on the light valves by a light combiner formed by intersecting dichroic reflection surfaces in X-letter form, followed by projecting the combined image by enlargement on a screen with a projection lens. The color separator is made by intersecting in X-letter form a first and second flat plate type dichroic mirrors. The second dichroic mirror is composed of two small dichroic mirrors made by separating into two parts of the intersecting part. The two small type dichroic mirrors are disposed on mutually different places so that, when viewed from the output side of the light which advances straightly through the color separator, the two edge surfaces which form the intersecting part of the two small dichroic mirrors are seen as being in overlapped state. Due to the existence of the two places of the intersecting parts of the dichroic mirrors, it is possible to make the produced bright lines on the projected image lens conspicuous.

12 Claims, 5 Drawing Sheets

PROJECTION DISPLAY APPARATUS

BACKGROUND OF THE INVENTION

1. Field of the Invention

The present invention relates to a projection display apparatus for producing on a screen an enlargement of an optical image formed on light valves by modulating lights with the light valves and projecting the modulated lights on the screen by a projection lens.

2. Description of the Prior Art

In order to effect display of images in a large picture size, there has been well known a method of forming on a relatively small light valve an optical image corresponding to an image signal as a variation of optical characteristic, modulating a light with the optical image, and projecting the modulated light on a screen by means of a projection lens. In the projection display apparatus of this type, the resolution of the projected image is nearly determined by the resolution of the light valve, and when the light source is intensified, a larger optical output is obtainable, so that when a light valve of high resolution is used, it becomes possible to realize a projection display apparatus having high resolution and large optical output even if its display area is small. Besides, recently notice has been made on a method of using a liquid crystal panel as a light valve. For example, Morozumi, et. al. proposed in "LCD Full-Color Video Projector", SID 86 Digest, p. 375, a method of obtaining a color projection image using three liquid crystal panels. A basic construction of the optical system proposed by Morozumi, et al. is shown in FIG. 6.

Lamp 1 radiates a light including the color components of red, green, and blue. The light radiated from the lamp 1 is converted into parallel rays by a condenser lens 2 and a concave mirror 3, passed through a heat absorbing filter 4, and then put into a component color separator 5. The component color separator 5 is disposed by placing a flat plate type red reflection dichroic mirror 6 and flat plate type blue reflection dichroic mirrors 7, 8 in X-form intersecting manner, by which the dichroic mirror surfaces 9, 10 lie on the same plane. The light incident on the component color separator 5 is divided into the lights of red, green, and blue. The red light is reflected by the plane mirrors 11, 12 and incident on the red liquid crystal panel 15. The green light is straightly passed and incident on the green liquid crystal panel 16. The blue light is reflected by the plane mirrors 13, 14 and incident on the blue liquid crystal panel 17. On the liquid crystal panels 15, 16, 17 there are formed the optical images of red, green, and blue as the variation of the transmissivity in proportion to the image signals, respectively. The output lights from the liquid crystal panels 15, 16, 17 are combined into a one-piece form by a light combiner 18, and a color image is formed substantially at the position of the green liquid crystal panel, and the color image is projected by enlargement on a screen 80 by means of a single projection lens 19. The light combiner 18 is a prism type dichroic mirror made by joining four rectangular prisms 20, 21, 22, 23, in which the red reflection dichroic multi-layered film is vacuum deposited on the joining surfaces 24, 25 and the blue reflection dichroic multi-layered film on the joining surfaces 26, 27.

The projection display apparatus shown in FIG. 6 has a characteristic to make it possible to change readily the picture size or the distance from the projection lens 19 to the screen 80, because of the use of a single projection lens. Further, since the component color separator 5 and the light combiner 18 cause to cross the dichroic reflection surface in X-letter form, there is a characteristic to reduce the space necessary for the optical system. The construction to intersect a pair of dichroic mirrors in X-letter form as a component color separator or a light combiner has already been disclosed by Schroeder in U.S. Pat. No. 2,642,487 as "component color separator".

By the way, when a pair of dichroic mirrors are intersected in X-letter form, an invalid area is necessarily formed on the intersecting part, and the obscure image of the intersecting part may appear on the screen. Accordingly, the light combiner 18 of the construction as shown in FIG. 6 makes the invalid area of the intersecting part 28 very fine. The intersecting part 29 of the component color separator 5 is also projected in obscure form on the screen, which however does not practically provide a problem if the F-number of the projection lens 19 is small, or if the diameter of the iris of the projection lens 29 is sufficiently large.

The prism type dichroic mirrors to be used as a light combiner 18 for the construction as shown in FIG. 6 are relatively expensive in comparison with those of a flat type, and become more expensive when the invalid area of the intersecting part 28 is made extremely fine. Accordingly, in order to reduce the cost of the apparatus, it is considered to use a flat type dichroic mirror made by intersecting with a light combiner 18 of a construction as shown in FIG. 5 in X-letter form, or to use a prism type dichroic mirror having no fine invalid zone of the intersecting part 28. However, if there are the intersecting parts 28, 29 in front and back of the liquid crystal panel, a bright line is formed at the center of the projected image. This bright line causes a significant problem in deteriorating the image quality.

In view of the fact that no bright line is seen when there is an intersecting part only on the component color separator 5 or the light combiner 18, the mechanism for generating the bright line is distinctly different from that in which the obscure images at the intersecting parts 28, 29 appear on the projected image. As a result of extensive study, the inventors have found out that the cause of this bright line could be explained, as follows:

A state of the case where parallel rays are incident on the component color separator 5 as shown in FIG. 6 is shown in FIG. 7. In this case, it is assumed that the thicknesses of the dichoic mirrors 6, 7, 8 are all equal. The inputted light 30 is dissolved into the rays 31, 32, 33 which advance in division into three directions by the dichroic mirrors 6, 7, 8. Due to the edge surfaces 34, 35 with which the small type dichroic mirrors 7, 8 are in close contact, there are produced the invalid areas 36, 37, 38 on the three output rays 31, 32, 33. These invalid areas 36, 37, 38 are seen as dark zone when observed through the projection lens 19. It is worth noticing that, when the thicknesses of the dichroic mirrors 6, 7, 8 are all equal, the width $d_G$ of the invalid area 37 of the light emitted in the direction of straight advance becomes two-fold the widths $d_R$, $d_B$ of the invalid areas 36, 38 of the light emitting in the width-wise direction.

Then, when the inside of the projection lens 19 is observed from the position near the center 81 of the screen 80, there are seen the two dark zones 40, 41 corresponding to the two intersecting parts 28, 29 in the iris 39, as shown in FIG. 8. The two dark zones 40, 41 are seen in overlapped state when observed from the center 81 of the screen 80, and they shift in the opposite directions to each other when the position of the eye is moved. Under the state where the two dark zones 40, 41 do not overlap, the total area of the dark zones becomes approximately the same without respect to the distance thereof, but under the state of overlap with the condition of contact between the two dark zones 40, 41, there are great differences in the total areas of the dark zone. When the eye position is moved in the vicinity of the center 81 of the screen 80, the size of the iris 39 is approximately the same, and only the total range of the dark zones sharply varies. Since the illuminance on the screen 80 is proportionate to the amount obtained by substracting the total area of the dark zone from the area of the iris 39, there appears sharp change in the illuminance near the center of the screen, which is seen as a bright line.

The bright line is prominently seen with the green light, but it scarely matters with the rays of red and blue. This is attributed to the fact that the optical path length from the intersecting part 29 of the component color separator 5 to each of the liquid crystal panels 15, 16, 17 is short in the green light, and long in the red and blue lights. That is to say, it is because of the fact that, when the dark zones of red and blue lights are observed from the area near the center 81 of the screen 80, the dark zones of the red and blue lights are seen at a distance farther than the dark zone of the green light, and for that part the dark zone of the red and blue lights are seen finer.

It is seen from the above that, in order to make the bright line less prominent, it is better to make at least one dark zone finer than the other dark zone. Thus, it becomes impossible to use a flat plate type dichroic mirror made by intersecting in X-letter form with both the component color separator 5 and the light combiner 18, or a prism type dichroic mirror in which the invalid area of the intersecting part is not fine. In order to make one of the two dark zones 40, 41 finer, it is conceivable to make at least one of the component color separator 5 or a light combiner 18 into extremely thin flat type dichroic mirror, but such dichroic mirror involves many problems from the points of mechanical strength and processability.

SUMMARY OF THE INVENTION

An object of the present invention is to provide a compact and low-priced projection display apparatus by settling the problems of bright line by a low-priced method.

A projection display apparatus of the present invention comprises a light source for irradiating a light containing three primary color components, a color separating means for separating the light from said light source into three primary color lights, three light valves for modulating each color light from said color separating means, a light combiner means for combining the outputted lights from the respective light valves into one by dichroic reflection surfaces intersecting in X-letter form, a projection lens for projecting on a screen an optical image of the outputted light from said light combiner means, and a driving circuit for driving each of the light valves according to an image signal, wherein said component color separator means is made by intersecting in X-letter form a first flat plate type dichroic mirror with a second flat plate type dichroic mirror, and a light path length from the intersecting part to each of the light valves is so made that a color light which advances straightly through said color separator means is the shortest, said second dichroic mirror being constructed by two small dichroic mirrors separated at said intersecting part so that the dichroic reflecting surfaces of said two small type dichroic mirrors are placed on mutually different planes to allow the two edge surfaces of said two small type dichroic mirrors forming said intersecting part to be seen at least partly overlapping.

When the two small type dichroic mirrors of the color separator means are constructed as mentioned above, the width of the invalid area of the color light which advances straightly through the color separator means becomes finer than the case where the reflecting surfaces of the two small type dichroic mirrors are each on the same plane. Accordingly, with respect to the color light which advances straightly through the color separator, the dark zone corresponding to the intersecting part of the color separator becomes finer when the iris of the projection lens is observed, and the steepness of the variation of the total area of the dark line is relaxed, so that the problem of bright line is improved.

As the light of the color reflected by the first dichroic mirror of the color separator means is free from the effect of the other small type dichroic mirror due to the use of one of the two small type dichroic mirrors, the problem of the bright line may be neglected as heretofore.

In the light of the color reflected by the second dichroic mirror of the color separator means, due to the fact that each of the dichroic rerflection surfaces of the two small type dichroic mirrors is not on the same plane, the width of the invalid area becomes coarse to about two-fold that of the conventional one, but because of the long distance from the intersecting part of the color separating means to the projection lens, the problem of the bright line may be neglected as heretofore.

In the above manner, the problems of bright line are improved.

These features and effects of the present invention will be more clarified by reference to the later-describd embodiments and the appended drawings.

DESCRIPTION OF THE PREFERRED EMBODIMENTS

Figure 1:
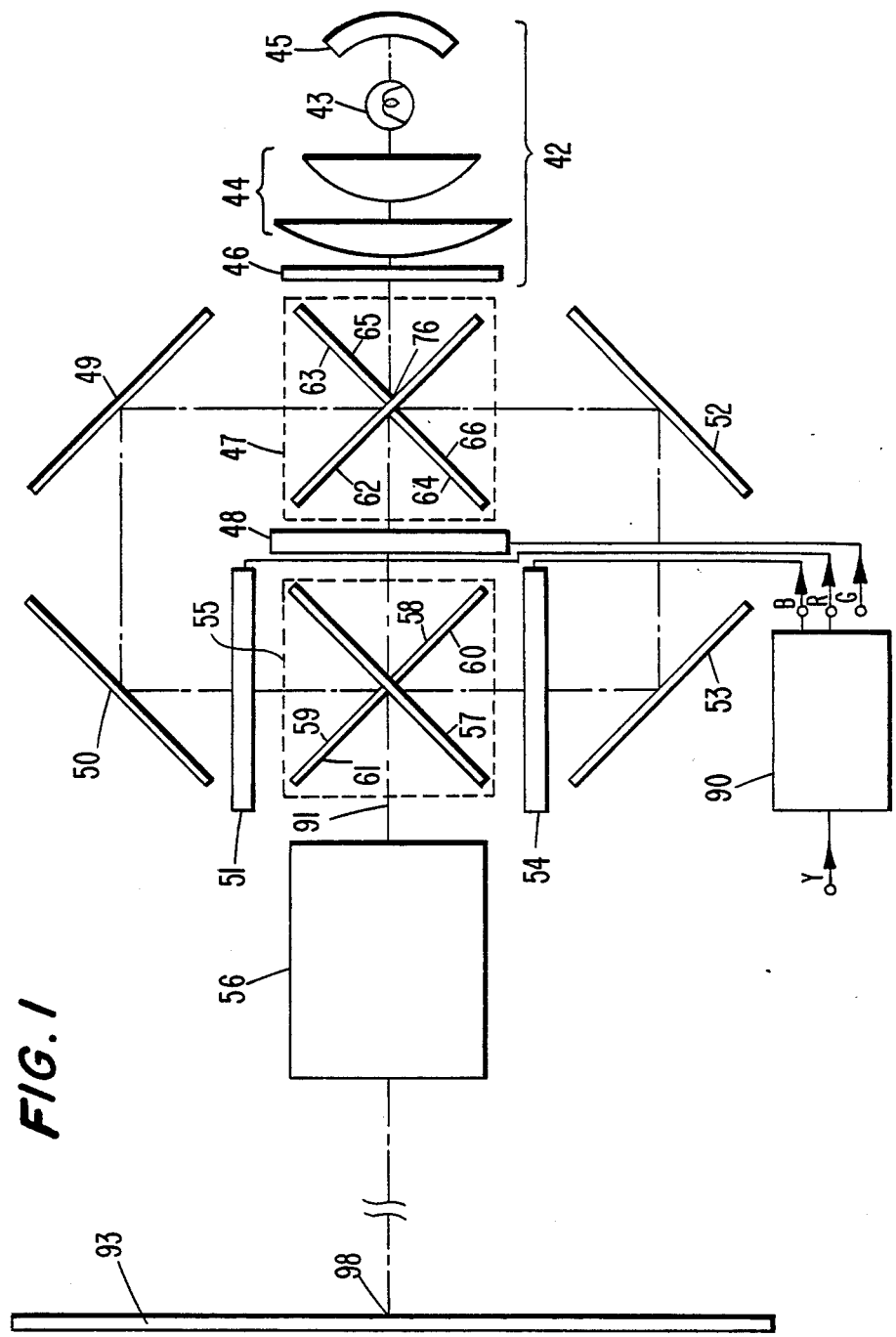
FIG. 1 is a schematic construction view showing a construction of the projection display apparatus in one embodiment of the present invention.

FIG. 1 shows a construction of the optical system in one embodiment of the present invention, wherein the parts denoted by numerals are respectively, as follows: 47—component color separator, 48, 51, 54—light valves, 55—light combiner, 56—projection lens, 62, 63, 64—dichroic mirrors, 90—driving circuit, and 93—screen.

The light source 42 is constructed by a lamp 43, a condenser lens 44, a concave mirror 45, and a heat absorbing filter 46. The lamp 43 radiates a light including the color components of three primary colors of red, green, and blue. The light radiated from the lamp 43 is converted into nearly parallel rays by means of the condenser lens 44 and the concave mirror 45, and outputted through the heat absorbing filter 46. The light outputted from the light source 42 is incident on the component color separator 47 and separated into the rays of red, green, and blue. The blue light as such advances straightly and is incident on the green light valve 48. The red light is subjected to bend of its light path by means of the two plane mirrors 49, 50, and then incident on the red light valve 51. The blue light is subjected to bend of its light path by means of the two plane mirrors 52, 53, and then incident on the blue light valve 54. The light valves 48, 51, 54 are the passing type liquid crystal panels each having matrix electrodes. The driving circuit 90 outputs electric signals R, G, B for controlling the transmittances of image elements of respective light valves 48, 51, 54, respectively, according to the image signal Y, and the light valves 48, 51, and 54 modulate the respective incident lights. The output lights from the light valves 48, 51, 54 are combined into a single form by means of the light combiner 55, and substantially a color image is combined at the position of the light valve 48. This color image is projected onto the screen 93 by means of the projection lens 56.

The light combiner 55 is disposed by rectangularly intersecting in X-letter form the flat plate type red reflection dichroic mirror 57 and the flat plate type blue reflection dichroic mirrors 58, 59 which are split into two parts. The blue reflection dichroic mirrors 58, 59 have the same optical characteristics, and the dichroic reflection surfaces 60, 61 are on the same plane.

Figure 2:
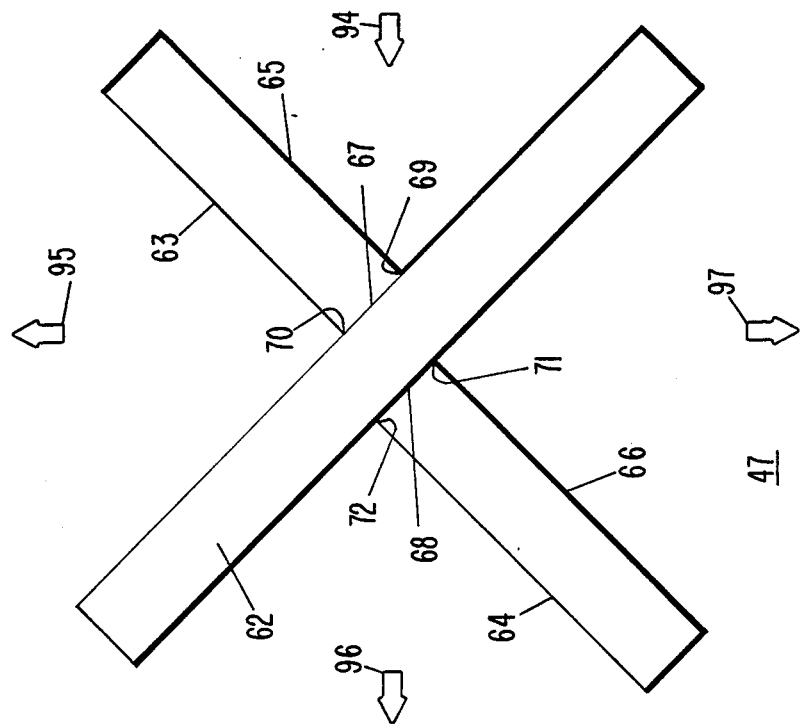
FIG. 2 is a sectional view of the component color separator of the projection display apparatus as shown in FIG. 1.

The component color separator 47 is, as shown by enlargement in FIG. 2, disposed by rectangularly intersecting in X-letter form the flat plate type red reflection dichroic mirror 62 and the small sized flat plate type blue reflection dichroic mirrors 63, 64 which are separated into two parts. The small sized dichroic mirrors 63, 64 have the same thicknesses and the same optical characteristics. When the output light 94 from the light source 42 is inputted into the component color separator 47, the red light 95, green light 96, and blue light 97 are outputted in division into three directions. What should be noted here is that the two dichroic reflection surfaces 65, 66 are on the planes which are mutually different from each other. This is a great characteristic of the construction of the present invention. And, it is so made that, viewed from the component color separator 47 from the direction of emission of the green light 96 as shown in FIG. 2, the edge surface 67 and the edge surface 68 are seen as if they are completely overlapped.

Figure 3A:
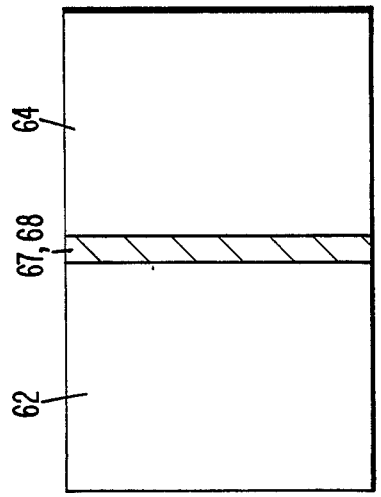
FIGS. 3 (a) and (b) are abbreviated views for illustrating the effects of the component color separator as shown in FIG. 2.
Figure 3B:
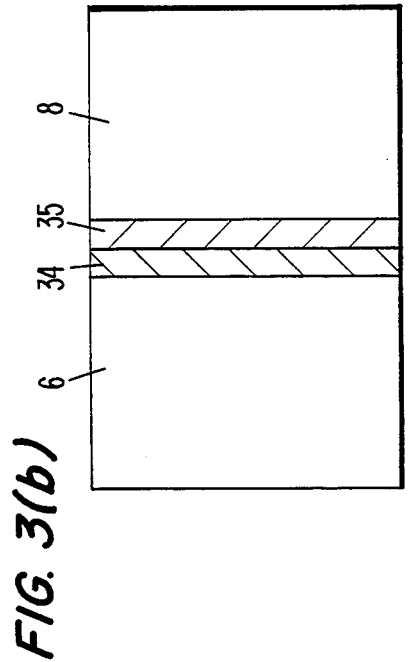
Figure 6:
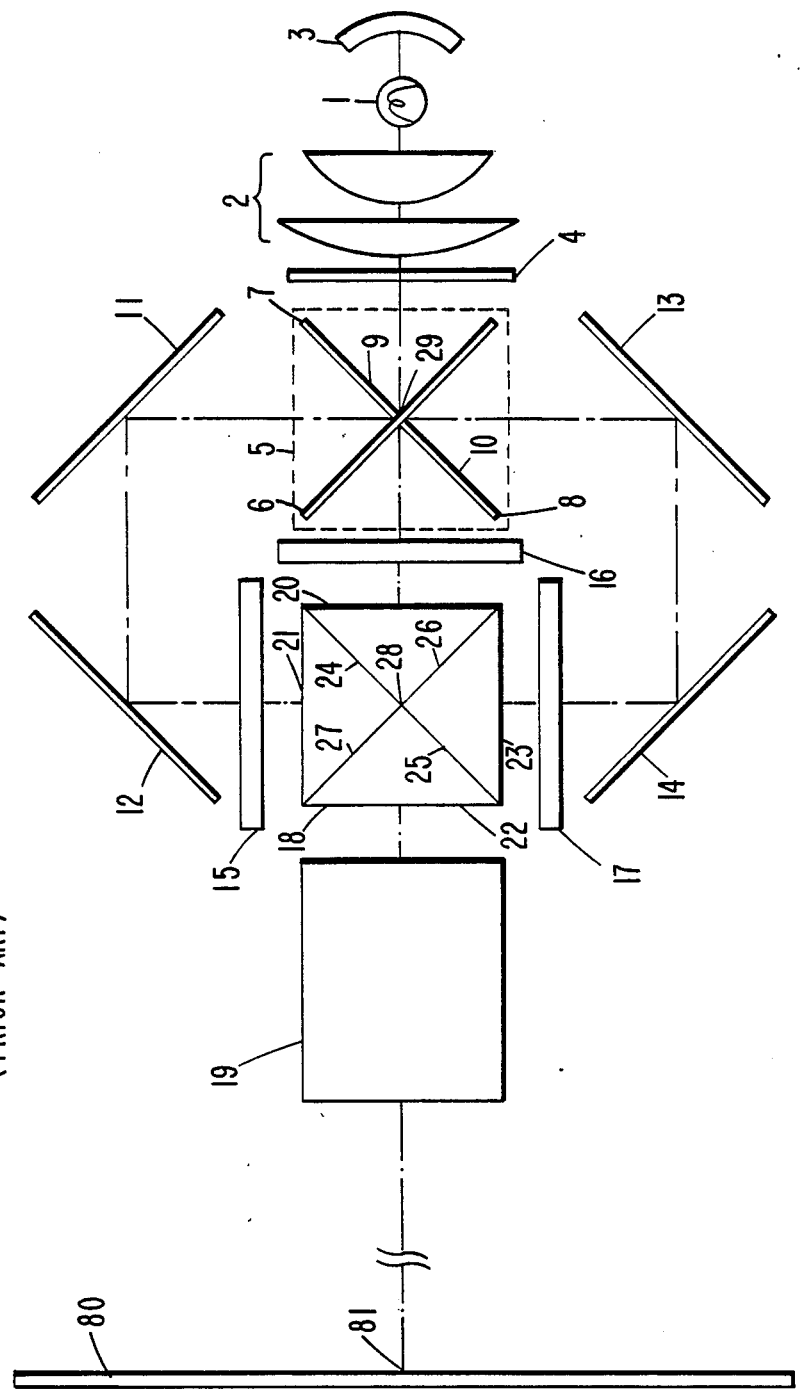
FIG. 6 is a schematic construction view showing the construction of the conventional projection display apparatus.

Further, the conventional component color separator 5 as shown in FIG. 6 is seen, as shown in FIG. 3 (b), that the edge surface 34 and the edge surface 35 are in adjacent relations.

Figure 4:
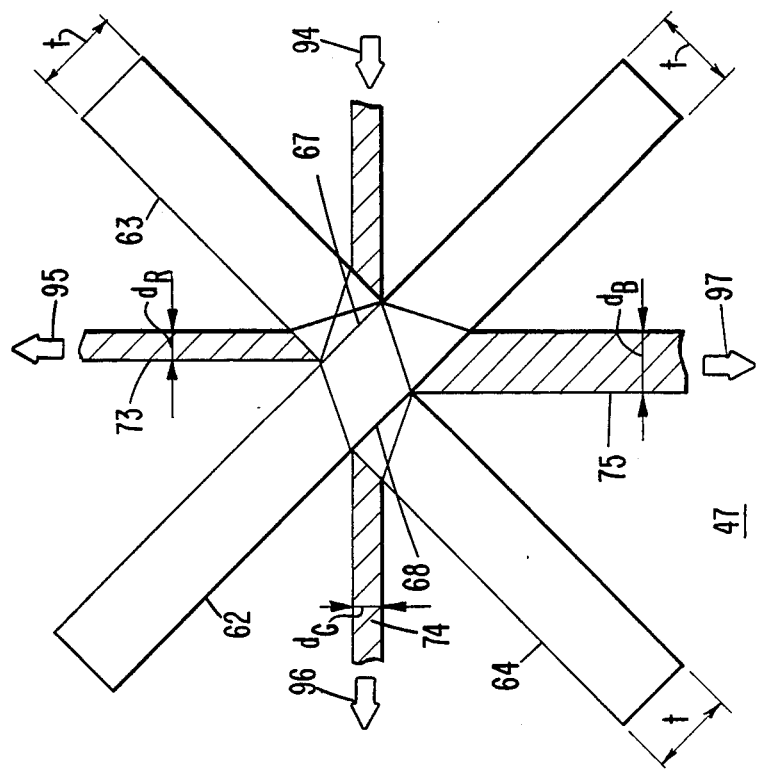
FIG. 4 is an abbreviated view for illustrating the activity of the component color separator as shown in FIG. 2.
Figure 7:
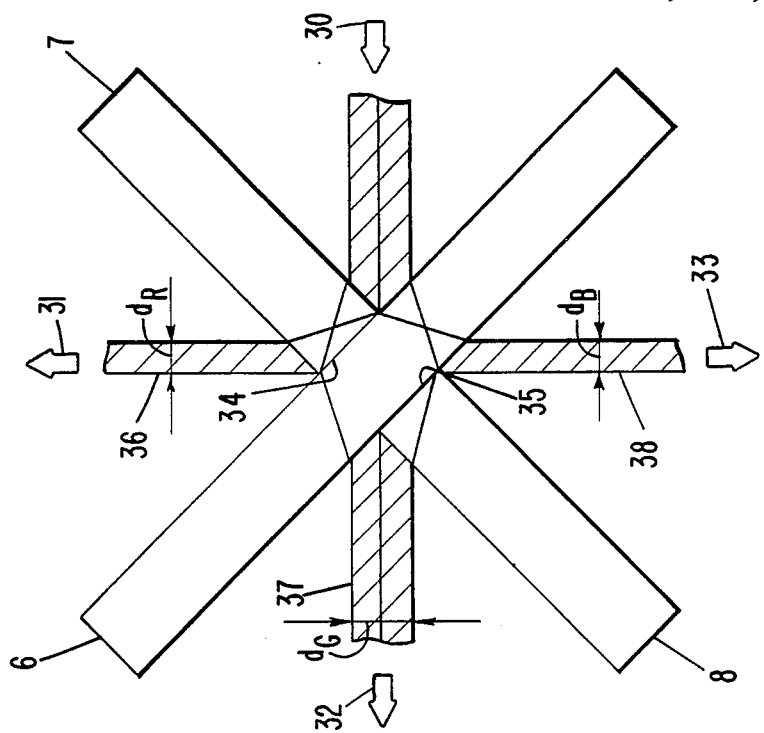
FIG. 7 is an abbreviated view for illustrating the construction of the conventional component color separator.
Figure 8:
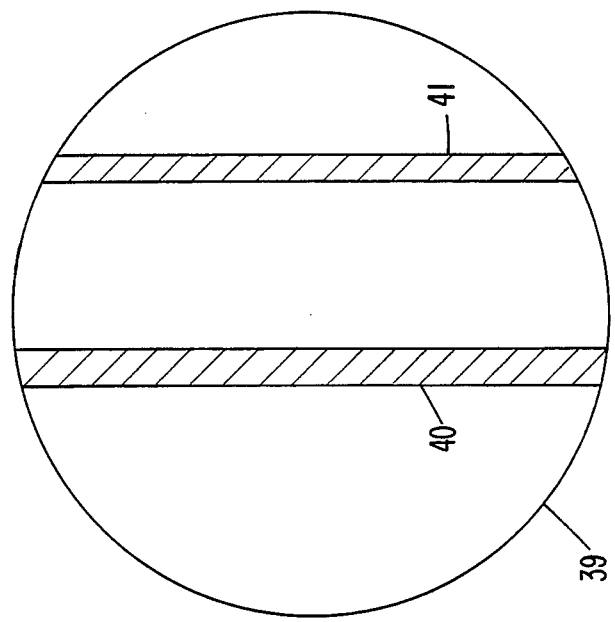
FIG. 8 is an abbreviated view for illustrating the cause of the bright line.

Hereinafter the activity of the component color separator 47 as shown in FIG. 2 is explained. FIG. 4 shows the state where parallel lights are allowed to be incident on the component color separator 47 which has been constructed into the desirable condition. To simplify explanation, it is assumed that the thicknesses of each of the dichroic mirrors 62, 63, 64 are all equal. In the same manner as in the case of the conventional component color separator as shown in FIG. 7, there are produced the invalid areas 73, 74, 75 on respective output lights by means of the edge surfaces 67, 68. Assuming the width of the invalid area 73 of the red light to be $d_R$, that of the invalid area 74 of the green light to be $d_G$, and that of the invalid area 75 of the blue light to be $d_B$, the following equation is obtained:

$$d_R:d_G:d_B = a:a:2a \quad (1)$$

Further, assuming the thicknesses of the dichroic mirrors 62, 63, 64 to be t each, and the refractive index of their glass substrates to be 1.5, then the relation will be:

$$a \approx t/3 \quad (2)$$

In the case of the conventional color separator means as shown in FIG. 7, the relation will be:

$$d_R:d_G:d_B = a:2a:a \quad (3)$$

Assuming that the thicknesses of the dichroic mirrors are to be equal, and comparing the widths of the invalid areas of each color light between FIG. 4 and FIG. 7, it is seen that the red light is the same, the green light is half, and the blue light is two-fold. Although the blue light shows double as much width of the invalid area 75, because the blue light has a long optical path from the intersecting part 76 to the projection lens 56, the problem of bright line may be neglected as in the conventional case.

From the above, it is seen that the width of the invalid area of the color light which advances straightly in the component color separator 47 which has a dominant position on the problem of bright line is made half the value of that of the conventional ones. And, it is seen that, when the iris of the projection lens 56 is observed, the dark zone corresponding to the intersecting part 76 of the component color separator 47 becomes half the conventional case, and so much the conspicuousness of the bright line is improved. The effect of the present invention can be explained from the comparison between FIG. 3 (a) with FIG. 3 (b). Even by comparing the widths of the dark zones actually observable through the projection lens, the width of the dark zone of the component color separator 47 as shown in FIG. 4 is seen as being about half the width of the dark zone of the conventional component color separator 5 as shown in FIG. 7.

In order to obtain the maximum effect with the present invention, attention may be paid to the following points: That is to say, the edge surfaces 67, 68 are respectively in planes at right angles to the dichroic reflection surfaces 65, 66, and the ridges 69, 70, 71, 72 of the edge surfaces 67, 68 have sharp edges. The edge surfaces 67, 68 are brought into contact with the red reflecting dichroic mirror 62. These steps are taken in order to make the widths of the invalid areas by the edge surfaces 67, 68 as fine as possible. In order to prevent the color lights reflected by the blue color reflecting small type dichroic mirrors 63, 64 from spreading before arriving at the light valve 54, it is recommended to keep the dichroic reflection surfaces 65, 66 of the small type dichroic mirrors 63, 64 parallel to each other.

Whether or not the two small type dichroic mirrors 63, 64 are disposed most optimally may be examined in the following manner: A white light source is disposed on the input light 94 side of the component color separator 47 and the component color separator 47 is observed from the direction of emission of the green light 96. Alternatively, using an optical system in which the light combining means 55 is excluded from the optical system as shown in FIG. 1, the intersecting part 76 of the component color separator 47 is observed through the projection lens 56. And, when the intersecting part 76 is observed while moving the eyes at the position corresponding to the optical axis 91 of the projection lens 56, the coarseness of the dark zone may become the smallest. Alternatively, the ridge lines 69, 71 at the ends of the dichroic reflecting surfaces 65, 66 of the small type dichroic mirrors 63, 64 may be allowed to coincide with each other. When the intersecting part 76 of the component color separator 47 is observed in a bright room, if the two small type dichroic mirrors 63, 64 are not optimally disposed, there can be seen the band of the color different from the effective area at the end of the invalid area of the intersecting part 76. Accordingly, it may be so practised that the intersecting part 76 of the component color separator 47 is observed from the position corresponding to the optical axis 91 of the projection lens 56 to examine whether or not the color band is seen at the end of the invalid area or the width of the color band is sufficiently fine in comparison with the width of the dark zone.

Next, explanation will be given using the example of substantial numerical values.

In case of the indicated sizes of the respective light valves 48, 51, 54 being 40 mm×60 mm, the projection lens 56 having a focal length of 150 mm and F-number of 2.5, the thickness of each of the dichroic mirrors 62, 63, 64 of the component color separator 47 being 0.55 mm, and the thickness of each of the dichroic mirrors 57, 58, 59 of the light combiner means 55 being 1.1 mm, the bright line was conspicuous under the conventional construction as shown in FIG. 6, but the bright line was improved to a practically acceptable degree when the construction as shown in FIG. 1 was adopted. In case of the thickness of the dichroic mirror being 0.55 mm, there was no problem with mechanical strength or processability. The appearance of the bright line in this case was well resembling to the condition where the thickness of each of the dichroic mirrors 6, 7, 8 was 0.3 mm in the conventional construction as shown in FIG. 6. However, when the thickness of the dichroic mirror was 0.3 mm, there were problems with mechanical strength and processability, which could not be adopted. As such, according to the present invention, it is possible to make the dichroic mirror to have such a thickness as is free from the apprehension of mechanical strength and processability and yet to make the bright line less conspicuous. While the thicknesses of the dichroic mirrors 63, 64 are made thinner than those of the dichroic mirrors 57, 58, 59 of the light combiner 55, it is in order to make the width of the dark zone corresponding to the component color separator 47 finer than the dark zone corresponding to the light combiner 55 so as to make the bright line less conspicuous.

Next, explanation will be made on other embodiment of the present invention.

While it was stated in the foregoing embodiment that the small type dichroic mirrors 63, 64 of the component color separator were made to have the edge surface 67 and the edge surface 68 to be completely overlapped when the component color separator 47 is viewed from the output side in the direction along the inputted light, the condition may be such that the edge surface 67 and the edge surface 68 overlap at least partially, by which the bright line can be made less conspicuous to a practically negligible degree in comparison with the conventional component color separator 5 shown in FIG. 7.

Figure 5:
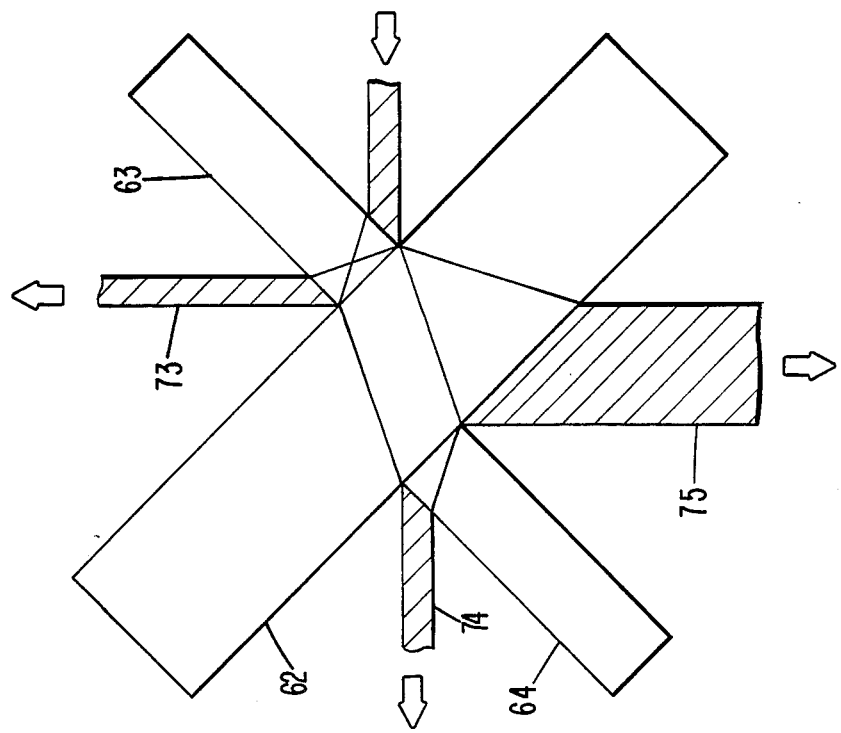
FIG. 5 is an abbreviated view for illustrating the activity of the component color separator in other embodiments of the present invention.

With the construction as shown in FIG. 1, it may be possible to make the thickness of the undivided dichroic mirror 62 of the component color separator 47 thicker than the thicknesses of the small type dichroic mirrors 63, 64. For instance, even when, in the aforementioned examples of numerical values, the thickness of the red reflection dichroic mirror 62 only was altered to 1.1 mm, twice as large thickness, the bright line was scarcely conspicuous. The state of the case where parallel rays are incident on such component color separator is shown in FIG. 5. Compared with the aforementioned example of numerical values, the widths of the invalid ranges of the red and green lights are the same, and the width of the invalid area of the blue light is coarse as being twofold, but, because of the long light path from the intersecting part 76 to the light valve 54 and the low visual sensitivity of blue light in comparison with the light of other colors, the bright line is less conspicuous. As it is possible to make the red reflection dichroic mirror 62 of large area thick, this method is advantageous in the points of mechanical strength and processability.

In the embodiment shown in FIG. 1, liquid crystal panels were used as the light valves 48, 51, 54. But, there may be used all light valves for forming the optical images proportionate to the image signal as a variation of optical characteristic such as a light valve using electro-optical crystal.

As a light combiner 55 of a construction as shown in FIG. 1, there may be used a prism type dichroic mirror in which the dichroic reflection surfaces intersect in X-letter form. For example, in the projection display apparatus of high resolution, the planeness of the dichroic reflection surface is made severer, so that there may be cases where the prism type dichroic mirror is preferred to the flat plate type dichroic mirror. In this case, due to the finer invalid range of the intersecting part 76 of the component color separator 47, there arises no problem of bright line even if the invalid area of the intersecting part of the light combiner 55 is coarse. As the prism type dichroic mirror having no fine invalid area of the intersecting part can be manufactured at relatively low cost, it is possible to expect lowering of the cost of the apparatus.

In the construction as shown in FIG. 1, the light of the color which advances straightly through the component color separator 47 was selected as green light, but it may be red or blue light. In this case, the characteristics of the dichroic multi-layered film to be used for the component color separator 47 and the light combiner 55 may be modified. The undivided dichroic mirror 62 of the component color separator 47 in FIG. 1 may be divided into two parts at the intersecting part 76. It is necessary for the dichroic reflecting surface separated into two parts to be on the same plane, and the two edge surfaces formed by division into two parts to be on the position not to interfere with the effective light. In either case, there can be obtained the action and effect similar to those of the above embodiments.

What is claimed is:

1. A projection display apparatus comprising:
   a light source for irradiating a light containing three primary color components;
   a color separating means for separating the light from said light source into three primary color lights;
   three light valves for modulating respective color lights from said color separating means;
   a light combiner means for combining outputted lights from the respective light valves into one light by dichroic reflection surfaces intersecting in X-letter form;
   a projection lens for projecting an optical image of the outputted light from said light combiner means; and
   a driving circuit for driving each of the three light valves according to an image signal,
   wherein said color separating means comprises a first flat plate type dichroic mirror and a second flat plate type dichroic mirror intersecting in X-letter form, light paths from the intersecting part to each of the light valves having lengths such that the path of the color light which advances straightly through said color separating means is the shortest, said second dichroic mirror being constructed by two dichroic mirrors separated at said intersecting part so that dichroic reflecting surfaces of said two dichroic mirrors are placed on mutually different planes to allow two edge surfaces of said two dichroic mirrors forming said intersecting part to be seen as being at least partially overlapping when the color separating means is observed from the output light side in a direction along its input light.

2. A projection display apparatus according to claim 1, wherein the dichroic reflecting surfaces of said two dichroic mirrors are disposed on mutually different planes so that the two edge surfaces forming said intersecting part are seen as being completely overlapped when the color separating means is observed from the output light side in the direction along the input light path.

3. A projection display apparatus according to claim 1, wherein the dichroic reflecting surfaces of said two dichroic mirrors are disposed on the mutually different planes so that the ridge parts of the dichroic reflecting surfaces of the two dichroic mirrors and the edge surfaces which form an intersecting part are seen as being completely overlapped when the color separating means is observed from the output light side in the direction along the input light path.

4. A projection display apparatus according to claim 1, wherein the dichroic reflecting surfaces of said two dichroic mirrors are disposed on the mutually different planes so that, when the intersecting part of the color separating means is observed from a position corresponding to an optical axis of the projection lens in a bright room, no band of a color different from an effective light is seen at the periphery of a dark zone, or the width of said color band is substantially negligible in comparison with the width of said dark zone.

5. A projection display apparatus according to claim 1, wherein the two dichroic mirrors of the color separating means are so disposed that their dichroic reflection surfaces are mutually parallel with each other.

6. A projection display apparatus according to claim 1, wherein the two dichroic mirrors of the color separating means are in contact with the first dichroic mirror.

7. A projection display apparatus according to claim 1, wherein the ridge parts of the two edge surfaces which form the intersecting part of the two dichroic mirrors of the color separating means are pointed.

8. A projection display apparatus according to claim 1, wherein the edge surface which forms an intersecting part of each of the two dichroic mirrors of the color separating means is a plane which is at a right angle to the dichroic reflection surface.

9. A projection display apparatus according to claim 1, wherein the thicknesses of the two dichroic mirrors of the color separating means are less than the thickness of the first dichroic mirror.

10. A projection display apparatus according to claim 1, wherein the first dichroic mirror of the color separating means is a blue reflection dichroic mirror.

11. A projection display apparatus according to claim 1, wherein the light combiner means comprises flat plate type dichroic mirrors intersecting in X-letter form.

12. A projection display apparatus according to claim 11, wherein the thicknesses of the two dichroic mirrors of the color separating means are less than the thickness of the dichroic mirror of the light combiner means.

* * * * *